US00RE34929E

United States Patent [19]

Kristen

[11] E Patent Number: Re. 34,929

[45] Reissued Date of Patent: May 9, 1995

[54] PLASTIC BAG FOR VACUUM SEALING

[75] Inventor: Hanns J. Kristen, San Anselmo, Calif.

[73] Assignee: Tilia, Inc., San Francisco, Calif.

[21] Appl. No.: 7,850

[22] Filed: Jan. 22, 1993

Related U.S. Patent Documents

Reissue of:

[64] Patent No.: 4,756,422
Issued: Jul. 12, 1988
Appl. No.: 36,323
Filed: Apr. 9, 1987

U.S. Applications:

[63] Continuation-in-part of Ser. No. 9,110, Jan. 28, 1987, abandoned, which is a continuation of Ser. No. 778,875, Sep. 23, 1985, abandoned.

[51] Int. Cl.[6] ..... B65D 81/20

[52] U.S. Cl. ..... 206/524.8; 383/105; 383/109; 383/113

[58] Field of Search ..... 206/524.8; 383/105, 383/109, 113

[56] References Cited

U.S. PATENT DOCUMENTS

| | | | |
|---|---|---|---|
| 2,672,268 | 3/1954 | Bower . | |
| 2,714,557 | 8/1955 | Mahaffy . | |
| 2,778,171 | 1/1957 | Taunton . | |
| 2,778,173 | 1/1957 | Taunton . | |
| 2,870,954 | 1/1959 | Kulesza . | |
| 3,142,599 | 7/1964 | Chavannes . | |
| 3,411,698 | 11/1968 | Reynolds . | |
| 3,587,794 | 6/1971 | Mattel | 190/43 |
| 3,809,217 | 5/1974 | Harrison | 206/0.86 |
| 3,958,693 | 5/1976 | Greene | 206/455 |
| 3,988,499 | 10/1976 | Reynolds | 428/474 |
| 4,093,068 | 6/1978 | Smrt | 206/443 |
| 4,449,243 | 5/1984 | Platel | 383/103 |
| 4,551,379 | 11/1985 | Kerr | 428/200 |
| 4,576,283 | 3/1986 | Fafournoux | 206/524.8 |
| 4,579,756 | 4/1986 | Edgel | 428/34 |
| 4,683,702 | 8/1987 | Vis | 53/433 |

FOREIGN PATENT DOCUMENTS

| | | |
|---|---|---|
| 1761403 | 7/1971 | Germany . |
| 2332927C2 | 9/1984 | Germany . |

*Primary Examiner*—Joseph Man-Fu Moy
*Attorney, Agent, or Firm*—Limbach & Limbach

[57] ABSTRACT

A plastic bag for vacuum packaging comprises an inner layer of heat sealable thermoplastic material which incorporates interconected air channels on its inner surface and an outer layer of gas impermeable material. Optionally, one or more intermediate layers may be included between the inner layer and the outer layer. The inner layer and the outer layer, and any intermediate layers, are joined together such that no air pockets exist between the inner layer and the outer layer.

16 Claims, 3 Drawing Sheets

PLASTIC BAG FOR VACUUM SEALING

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 009,110 filed Jan. [1] *28,* 1987, now abandoned which is a continuation of application Ser. No. 778,875 filed Sept. 23, 1985, now abandoned.

BACKGROUND OF THE INVENTION

*An object of this invention is to overcome the above, briefly described problems by providing a tubular receptacle adapted to be formed into an evacuated and sealed bag comprising first and second superimposed plastic panels, each having a uniform thickness and defining inner and outer surfaces thereon, joined together at opposite lateral sides thereof to define a chamber adapted to have a product disposed therein. Each of the first and second panels comprises a uniform inner layer, defining one of said inner surfaces thereon, composed of a heat sealable material, and a uniform outer layer composed of a gas impermeable material. A plurality of raised protuberances, having said uniform thickness and formed in a generally regular and waffle-like pattern on the inner surface of at least one of the first and second panels, project outwardly therefrom towards the inner surface of the other panel to define a plurality of intercommunicating channels entirely around and between the protuberances.*

*In another aspect of this invention, an intermediate layer is bonded between the inner and outer layers of at least one of the first and second panels and is composed of a material exhibiting a stiffness greater than each of the inner and outer layers.*

*In still another aspect of this invention, the protuberances have a width and length substantially greater than the width of each channel portion disposed between each adjacent pair of protuberances and each protuberance has an exposed surface area on a distal end thereof, directly facing the inner surface of the other panel, that is substantially larger than the channel portion when the protuberances and channels are viewed in plan view.*

1. Field of the Invention

The present invention relates to packaging materials and, in particular, to a plastic bag for vacuum packaging of perishable items.

2. Discussion of the Prior Art

There is a need for a bag adapted for use in either a home or a commercial environment such that it may be easily evacuated and then heat sealed for the vacuum packaging of perishable items.

U.S. Pat. No. 3,809,217 titled "Packaging for Flat Objects", issued to Harrison on May 7, 1974, describes a two-layer packaging material that consists of a flat outer layer of paper or plastic film joined with an embossed inner layer of heat sealable polystyrene. However, owing to the configuration of the embossed pattern of the polystyrene inner layer, air pockets are trapped between the inner and outer layers, rendering the material unsuitable for vacuum packaging of perishable items.

Most heat sealable thermoplastics, including polystyrene and food-safe polyethylene and polypropylene, are gas permeable materials. Thus, air trapped between the two layers of the Harrison packaging material will diffuse into the interior of the bag, spoiling the perishable items contained therein. Furthermore, the Harrison packaging material is intended as a relatively stiff container for protecting flat objects from physical damage and for making it difficult to identify their surface structure by feeling the package. Few perishable items are inherently flat, rendering the Harrison packaging material unsuitable for applicant's primary intended purpose.

U.S. Pat. No. 4,093,068 titled "Packing Sheet and Packages Formed Thereby", issued to Thomas J. Smrt on June 6, 1978, also describes a two-layer material for packaging objects. The Smrt material features air pillows which protrude into the interior of the resulting package in order to hold the contents more firmly. Thus, for the same reasons stated above with respect to the Harrison packaging material, the Smrt material is also not suitable for vacuum packaging.

SUMMARY OF THE INVENTION

It is an object of the present invention to provide an improved plastic bag for vacuum packaging such that air can be completely extracted from the bag. At the same time, the bag is both heat sealable as well as capable of preventing the later reentry of gases, particularly oxygen, into the interior of the bag. Finally, the entire process of creating the vacuum and sealing the bag is simple enough to be applicable to both a home or a commercial appliance.

The present invention meets the above-mentioned objects by providing a plastic bag which comprises an inner layer of heat sealable thermoplastic material and an outer layer of gas-impermeable material. The thermoplastic material incorporates interconnected air channels on its inner surface to permit air to flow from all areas of the bag when suction is applied. To prevent air from diffusing into the interior of the bag after it has been evacuated and heat sealed, the inner layer and the outer layer are joined together over their entire adjacent surfaces such that no air pockets exist between the layers. Optionally, one or more intermediate layers may be "sandwiched" between the inner heat sealable layer and the outer gas-impermeable layer to provide additional characteristics to the bag as desired, a criteria being that each of the layers comprising the bag be joined such that no air pockets exist between the inner layer and the outer layer.

These and other objects, advantages and features of the present invention will become apparent by reference to the detailed description provided below which is to be considered in conjunction with the attached drawings.

DETAILED DESCRIPTION OF A PREFERRED EMBODIMENT

Figure 1:
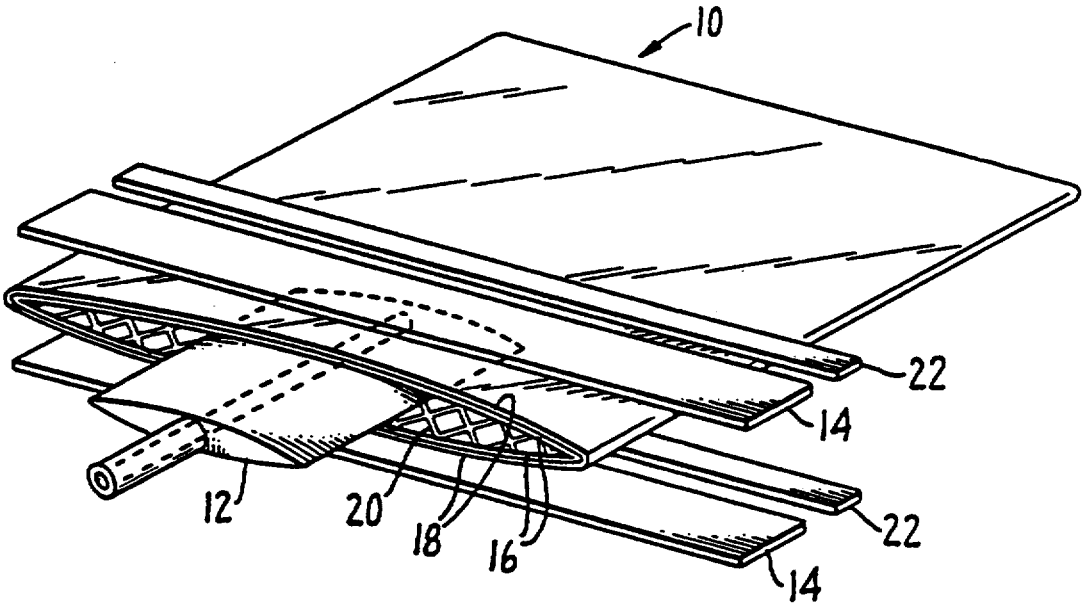
FIG. 1 is a perspective view illustrating a plastic bag in accordance with the present invention.

FIG. 1 shows a plastic bag 10 with a nozzle 12 from a vacuum pump inserted into its open end. The nozzle 12 is of a flat, tapered design so that the bag 10 can be held air-tight around the nozzle by means of hard foam rubber clamps 14 which are held tightly together for this purpose.

The [sides] *two panels* of the bag 10 are *each* made of at least two layers. An inner layer 16 is formed from a heat sealable thermoplastic material. An outer layer 18 is formed from a gas-impermeable material to provide a barrier against the influx of air to the interior of the bag 10 after it has been sealed. The inner layer 16 includes a pattern of intersecting channels 20 formed on at least one of its facing inner surfaces. When the open end of the bag 10 is held air tight around the nozzle 12 by means of rubber clamps 14, a vacuum pump (not shown) can be started and air can be extracted from the interior of the bag 10. Total collapse of the bag 10 is prevented by the channels 20. Thus, all air can be removed from the interior of the bag 10, creating the desired vacuum. The mechanical pressure of the rubber clamps 14 maintains the air-tight seal of the bag 10 during the pumping cycle. Once the vacuum has been achieved, the bag 10 is heat sealed by pressing heat sealing clamps 22 together. It should be noted that these heat sealing clamps 22 are located in front of the nozzle 12. After sealing, both the rubber clamps 14 and the sealing clamps 22 can be released and the nozzle 12 withdrawn. The inner heat sealable layer 16 and the outer gas-impermeable layer 18 are joined together over their entire adjacent surfaces such that no air pockets exist between the inner layer 16 and the outer layer 18.

Optionally, one or more intermediate layers may be "sandwiched" between the inner layer 16 and the outer layer 18 to provide additional characteristics to the bag 10 as desired. For example, an intermediate stiffener layer may be added. In any such multilayer configuration, to prevent the influx of gases after the bag has been vacuum sealed, the layers of the bag must be joined together such that no air pockets exist between the heat sealable inner layer and the gas-impermeable outer layer.

The bags 10 can be made as individual bags or as continuous bag rolls.

Figure 2:
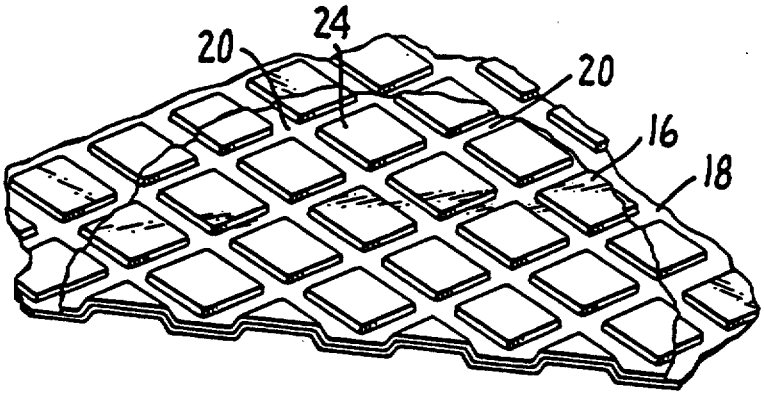
FIG. 2 is an enlarged perspective view illustrating the inner structure of a bag in accordance with the present invention.

FIG. 2 illustrates an example of a crisscrossing channel design of the inner layer 16. In the illustrated embodiment, the inner layer 16 is embossed with a rectangular pattern 24 in such a way that the grooves between the "islands" form a distinctive inner channel pattern.

Figure 3:
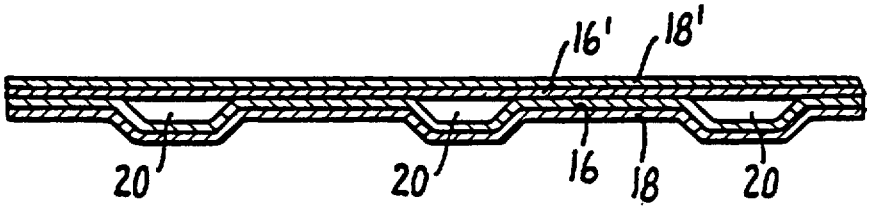
FIG. 3 is a cross-sectional view illustrating the structure of a plastic bag in accordance with the present invention.

FIG. 3 shows a pattern embossed on one surface of both layer 16 and layer 18 of the formerly flat compound film. Thus, FIG. 3 shows that only one side of the bag 10 may feature the channels 20, while the opposite flat side is composed of two flat layers 16' and 18' which can be made of the same materials as the layers 16 and 18. Even after the two interior surfaces of the bag 10 touch, the channels 20 remain intact for the complete evacuation of air from the bag 10.

*From the above description and accompanying drawings, it can be appreciated by those skilled in the art that applicant has provided an improved receptacle (e.g., FIG. 1) that is adapted to be formed into an evacuated and sealed bag for both home and commercial use. The receptacle preferably comprises superimposed plastic panels of uniform thickness joined together at opposite lateral sides thereof to define a chamber adapted to have a product disposed therein. Each of the panels comprises a uniform inner layer 16, 16' composed of a heat sealable material, and a uniform outer layer 18, 18' composed of a gas impermeable material.*

*The plurality of raised protuberances comprising pattern 24 (FIG. 2) are formed in a generally regular and waffle-like pattern on the inner surface of at least one of the panels to project outwardly therefrom towards the inner surface of the other panel. As described above, this pattern thus defines the plurality of intercommunicating channels 20 entirely around and between the protuberances. As shown in FIG. 3, the protuberances may be solely formed on the inner surface of one panel with the inner surface of the other panel being flat and uninterrupted.*

*As further shown in FIG. 3, the distal ends of the protuberances and the bottom surfaces defining channels 20, facing the inner surface of the other panel, each define at least generally flat and exposed surface areas thereon that are co-planar relative to each other. Each exposed surface area is shown as being rectangular (square) and each protuberance and each channel as being trapezoidal, when viewed in cross-section. The protuberances are further formed in the panel to form a plurality of interconnected and raised ridges on the outer surface thereof that project outwardly therefrom to define channels 20 therein. In the embodiment shown in FIG. 3, the outer surface areas of the ridges are at least generally flat and co-planar relative to each other.*

Figure 4:
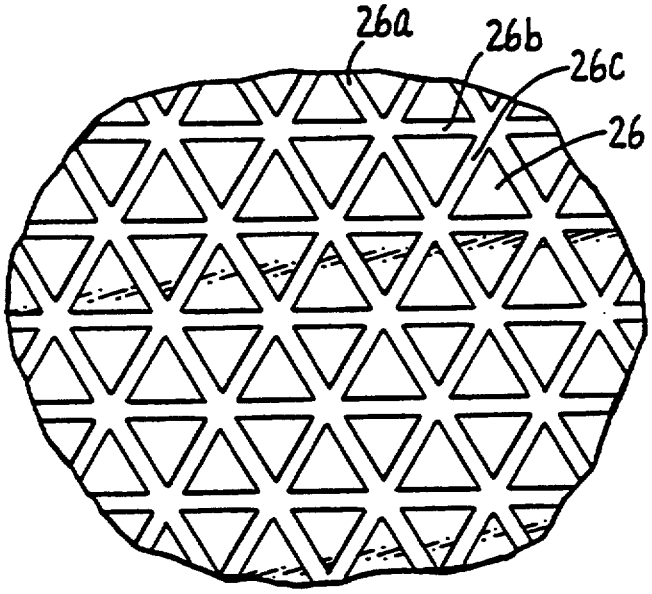
FIG. 4 is a top view illustrating the inside layer of a plastic bag in accordance with the present invention.

FIG. 4 illustrates an alternative embossing pattern 26 in channels 20. The pattern is triangular, rendering a channeled pattern of three sets of parallel lines 26a, 26b and 26c which intersect at 60° angles.

Figure 5:
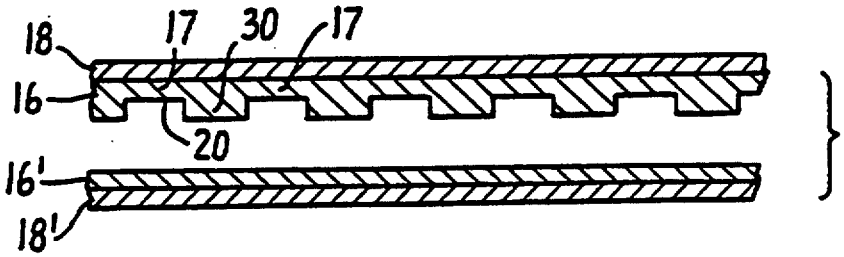
FIG. 5 is a cross-sectional view illustrating the structure of a plastic bag in accordance with the present invention.

FIG. 5 shows an embodiment of the bag 10 in which the inner layer 16 [as] *has* been made to carry a design created by thickness variations in such a way that channels 20 are formed in the areas of reduced thickness [28] *17* while the islands 30 form the contact area with the opposite bag side. The outer layer 18 is flat and joined over its entire surface with the outer flat surface of inner layer 16. The opposite side of the bag 10 is, in this case, a flat compound film made of corresponding layers 16' and 18'.

As stated above, the inner layer 16 is, preferably, polyethylene, which is food safe but does not constitute an oxygen barrier. It also is not by itself boilable nor has it sufficient mechanical strength. In contrast, the outer layer 18, which preferably is made of polyester or polyamide (nylon), has good mechanical properties, is an excellent oxygen barrier, but need not be either food safe or heat sealable.

The plasticity temperature of the outer layer 18 typically is above 200° C., while that of the inner layer 16 is below 130°. When heat sealing clamps 22 heat the outer layer 18, heat is also transported to the inner layer 16 which is then heat sealed. Because of the substantially higher plasticity and melting temperatures of the outer layer 18, there is no danger of melting or puncturing the outer layer 18 during the heat sealing cycle which is designed for the inner layer 16.

In practical application, the wall thickness of the compound film is between 2.5 and 4.5 mils. The thickness of the gas impermeable outer layer 18 is approximately 0.5–1.0 mils (50–100 gauge), with the heat sealable inner layer 16 comprising the remainder of the thickness.

Referring to FIG. 3, according to a preferred embodiment of the invention, the outer layer 18' of the flat side of the bag 10 comprises polyester or nylon of a thickness of 0.5–1.0 mils. The inner layer 16' comprises polyethylene or polypropylene at a thickness of 1.5–3.0 mils. These films are laminated, coextruded or extrusion-coated to form a single transparent film such that the outer layer 18' and the inner layer 16' are joined together over their entire adjacent surfaces. For the channeled side of the bag 10, the materials and the joining of the outer layer 18 and the inner layer 16 are as described with respect to the flat side; however, the thickness of the channel side layers may be different and one or both layers may be opaque white.

The regular or irregular pattern of interconnecting air channels can be created during the co-extrusion or extrusion-coating processing of the multi-layer film, or it may be post-embossed, forming a corresponding pattern of ridges on the nylon/polyester side. The depth of these channels is typically not less than three times the film thickness. The embossing may be done on steel to steel or rubber to steel roller machines, the first being faster, but requiring very tight adjustment tolerances in order not to damage the [firm] *film*. The latter is slower, but more forgiving.

During post-embossing, the different plasticity and melting temperatures of the two adjacent layers 16 and 18 must be taken into consideration. Temperatures have to be high enough to allow the outer layer 18 of nylon or polyester to accept the pattern without tearing or damage, but not high enough to melt the inner layer 16. The available temperature range is extremely small and must be accurately monitored. Heat may be introduced through the rollers by hot air or infrared radiation. The later is quicker to react to adjustments and, thus, particularly suited for steel to steel roller machines.

The embossing process can be done with state of the art equipment provided special care is taken and the requirements of the multi-layer film are met.

The two films, i.e. the flat side consisting of outer layer 18' and inner layer 16' and the embossed side consisting of outer layer 18 and inner layer 16, are joined by means of heat seals along the edges of 8" or 11" wide strips with the heat sealable polyethylene layers facing each other, thus forming an open tube or an endless open bag. These endless bags are then cut and sealed across to any desired bag length or cut and rolled into 20" continuous bag rolls.

As stated above, the bag 10 may be constructed to include layers intermediate the heat sealable inner layer and the gas-impermeable outer layer so long as the layers are joined together over their entire adjacent surfaces such that no air pockets exist between the inner layer and the outer layer. In one such embodiment of the invention, the inner layer is low density, heat sealable polyethylene about 0.5–1.0 mils thick. An intermediate layer comprises high density polyethylene about 1.5 mils thick to impart stiffness to the bag structure. The outer, gas-impermeable layer is nylon about 0.5 mils thick. Thus, the multi-layer film which forms the bag, and which may be formed by co-extrusion of the three above-mentioned materials, is about 3.0–3.5 mils total thickness.

Figure 6:
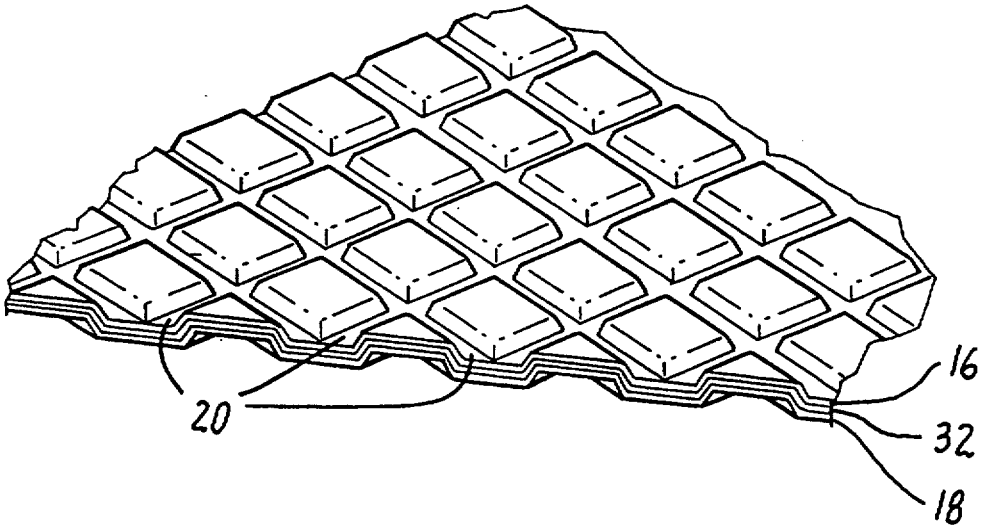
*FIG. 6 is an enlarged perspective view illustrating the inner structure of a bag panel that has an intermediate layer in accordance with the present invention.*
Figure 7:
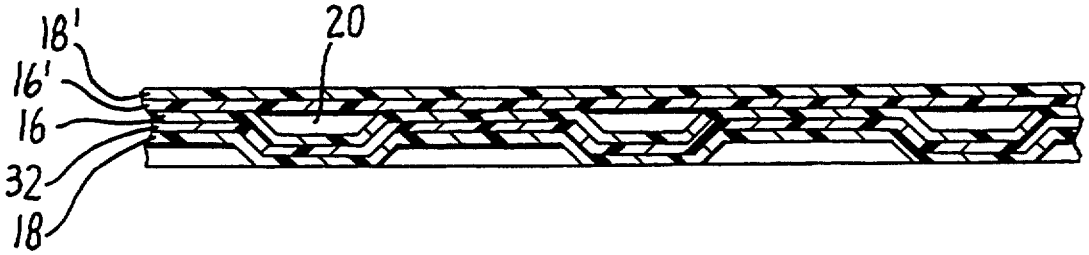
*FIG. 7 is a cross-sectional view illustrating the structure of a plastic bag with an intermediate layer in accordance with the present invention.*

*FIGS. 6 and 7 illustrate a bag with an intermediate layer 32 sandwiched between the inner layer 16 and the outer layer 18. FIG. 6 is a perspective view showing one panel formed from a three-layer film, with air channels 20 between and among the protuberances. FIG. 7 is a cross-sectional view of an assembled bag, where one panel is formed from a three-layer film.*

It should be understood that various alternatives to the embodiments of the invention described herein may be employed in practicing the invention. It is intended that the following claims define the invention and that structures within the scope of these claims and their equivalents be covered thereby.

What is claimed is:

1. A tubular receptacle adapted to be formed into an evacuated and sealed bag comprising first and second superimposed plastic panels, each having a uniform thickness and defining inner and outer surfaces thereon, joined together at opposite lateral sides thereof to define a chamber adapted to have a product disposed therein, each of said first and second panels comprising an uniform inner layer, defining one of said inner surfaces thereon, composed of a heat sealable material, and an uniform outer layer composed of a gas impermeable material, and a plurality of raised protuberances having said uniform thickness and formed in a generally regular and waffle-like pattern on the inner surface of at least one of said first and second panels to project outwardly therefrom towards the inner surface of the other panel to define a plurality of intercommunicating channels entirely around and between said protuberances.

2. The receptacle of claim 1 wherein said inner layer is composed of polyethylene or polypropylene.

3. The receptacle of claim 1 wherein said outer layer is composed of polyester or nylon.

4. The receptacle of claim 1 wherein said protuberances are solely formed on the inner surface of said first panel and the inner surface of said second panel is flat and uninterrupted.

5. The receptacle of claim 1 wherein [distral] *distal* ends of said protuberances and bottom surfaces defining said channels and which face the inner surface of said other panel each define at least generally flat and exposed surface areas thereon that are coplanar relative to each other.

6. The receptacle of claim 5 wherein each said exposed surface area is rectangular and each said protuberance and each said channel is trapezoidal, when viewed in cross-section.

7. The receptacle of claim 6 wherein each said exposed surface area is square.

[8. The receptacle of claim 4 wherein said protuberances are further formed in said first panel to form a plurality of interconnected and raised ridges on the outer surface of said first panel that project outwardly therefrom to define said channels thereon and that further define a plurality of non-intercommunicating closed cavities between said ridges so that when the outer surface of said first panel is placed on a flat platen said cavities will not communicate with each other when air is evacuated through said channels.]

[9. The receptacle of claim 8 wherein outer surface areas of said ridges are at least generally flat and co-planar relative to each other.]

[10. The receptacle of claim 1 wherein the width and length of each of said protuberances are each at least approximately twice the width of each adjacent and surrounding channel.]

11. The receptacle of claim 1 further comprising an intermediate layer bonded between the inner and outer layers of said at least one of said first and second panels having said protuberances formed thereon, said intermediate layer composed of a material exhibiting a stiffness greater than each of said inner and outer layers.

12. The receptacle of claim 11 wherein said inner layer is composed of low density polyethylene or polypropylene, said outer layer is composed of polyester or Nylon and said intermediate layer is composed of high density polyethytlene.

13. The receptacle of claim 12 wherein said inner, *intermediate and* outer [and intermediate] layers have thicknesses of about 0.5 to 1.0 mil, 1.5 mil, and 0.5 mil, respectively.

14. A tubular receptacle adapted to be formed into an evacuated and sealed bag comprising first and second superimposed panels, each having inner and outer surfaces, joined together at opposite lateral sides thereof to define a chamber adapted to have a product disposed therein, each of said first and second panels comprising an inner layer composed of a heat sealable material defining each said inner surface, and an outer layer composed of a gas impermeable material, an intermediate layer bonded between the inner and outer layers of at least one of said first and second panels and composed of a material exhibiting a stiffness greater than each of said inner and outer layers, and a plurality of protuberances formed in a generally regular and waffle-like pattern on the inner surface the one or more of said first and second panels, that includes said intermediate layer, to project outwardly from such inner surface towards the other panel to define a plurality of interconnecting channels entirely around and between said protuberances.

15. The receptacle of claim 14 wherein said inner layer is composed of low density polyethylene or polypropylene, said outer layer is composed of Nylon or polyester and said intermediate layer is composed of high density polyethylene.

16. The receptacle of claim 15 wherein said inner, *intermediate and* outer [and intermediate] layers have thicknesses of about 0.5 to 1.0 mil, 1.5 mil, and 0.5 mil, respectively.

17. The receptacle of claim 14 wherein said protuberances are solely formed on the inner surface of said first panel and the inner surface of said second panel is flat and uninterrupted.

18. The receptacle of claim 14 wherein distal ends of said protuberances and bottom surfaces defining such channels and which face the inner surface of said other panel each define at least generally flat and exposed surface areas thereon that are coplanar relative to each other.

[19. The receptacle of claim 17 wherein said protuberances are further formed in said first panel to form a plurality of interconnected and raised ridges on the outer surface of said first panel that project outwardly therefrom to define said channels therein and that further define a plurality of non-intercommunicating closed cavities between said ridges so that when the outer surface of said first panel is placed on a flat platen said cavities will not communicate with each other when air is evacuated through said channels.]

20. A tubular receptacle adapted to be formed into an evacuated and sealed bag comprising first and second superimposed plastic panels, each having inner and outer surfaces, joined together at opposite lateral sides thereof to define a chamber adapted to have a product disposed therein, each of said first and second panels comprising an inner layer, defining one of said inner surfaces thereon, composed of a heat sealable material, and an outer layer composed of a gas impermeable material, and a plurality of raised protuberances formed in a generally regular and waffle-like pattern on the inner surface of at least one of said first and second panels to project outwardly therefrom towards the inner surface of the other panel to define a plurality of interconnecting channels entirely around and between said protuberances, said protuberances having a width and length substantially greater than the width of each channel portion disposed between each adjacent pair of protuberances and each protuberance having an exposed surface area on a distal end thereof, directly facing the inner surface of the other panel, that is substantially larger than said channel portion when said protuberances and channels are viewed in plan view.

* * * * *